US005740988A

United States Patent [19]
Ausdenmoore

[11] Patent Number: 5,740,988
[45] Date of Patent: Apr. 21, 1998

[54] AXISYMMETRIC VECTORING NOZZLE ACTUATING SYSTEM HAVING MULTIPLE POWER CONTROL CIRCUITS

[75] Inventor: Robert M. Ausdenmoore, West Chester, Ohio

[73] Assignee: General Electric Company, Cincinnati, Ohio

[21] Appl. No.: 422,731

[22] Filed: Apr. 13, 1995

[51] Int. Cl.⁶ ............................................. B64C 15/02
[52] U.S. Cl. ........................ 244/52; 244/216; 244/78; 239/265.33; 239/265.37; 239/265.39; 91/448; 91/440
[58] Field of Search ..................... 244/52, 78, 216; 239/265.33, 265.37, 265.39, 265.41; 91/445, 448, 440

[56] References Cited

U.S. PATENT DOCUMENTS

| | | | |
|---|---|---|---|
| 2,272,725 | 2/1942 | Overbeke | 244/78 |
| 2,834,182 | 5/1958 | Culbertson | 60/35.6 |
| 3,136,504 | 6/1964 | Carr | 244/78 |
| 3,138,002 | 6/1964 | Ernst et al. | 244/78 |
| 3,171,618 | 3/1965 | Rasmussen | 244/78 |
| 3,554,084 | 1/1971 | Rasmussen | 91/3 |
| 3,612,400 | 10/1971 | Johnson et al. | 239/265.19 |
| 3,806,063 | 4/1974 | Fitzgerald | 244/3.22 |
| 4,000,854 | 1/1977 | Konarski et al. | 239/265.35 |
| 4,030,291 | 6/1977 | Sargisson | 60/226 A |
| 4,128,208 | 12/1978 | Ryan et al. | 239/265.39 |
| 4,428,196 | 1/1984 | Boehringer | 244/78 |
| 4,538,504 | 9/1985 | Kast | 91/461 |
| 4,704,865 | 11/1987 | Archung | 60/405 |
| 4,711,089 | 12/1987 | Archung | 60/405 |
| 4,718,647 | 1/1988 | Ludwig | 267/64.11 |
| 4,805,515 | 2/1989 | Kast | 91/461 |
| 4,807,517 | 2/1989 | Daeschner | 91/384 |
| 5,011,080 | 4/1991 | Barcza et al. | 239/265.39 |
| 5,074,495 | 12/1991 | Raymond | 244/78 |
| 5,115,720 | 5/1992 | Babson et al. | 91/448 |
| 5,174,502 | 12/1992 | Lippmeier et al. | 239/265.41 |
| 5,215,257 | 6/1993 | Barcza | 239/265.39 |
| 5,261,605 | 11/1993 | McLafferty et al. | 239/265.35 |
| 5,267,436 | 12/1993 | Wood et al. | 244/52 |
| 5,279,107 | 1/1994 | Meisner et al. | 60/39.03 |
| 5,335,489 | 8/1994 | Thayer | 60/230 |

FOREIGN PATENT DOCUMENTS

| | | |
|---|---|---|
| 0 512 833 A1 | 11/1992 | European Pat. Off. . |
| 1 288 302 | 9/1972 | United Kingdom . |

*Primary Examiner*—Andres Kashnikow
*Assistant Examiner*—Tien Dinh
*Attorney, Agent, or Firm*—Andrew C. Hess; Wayne O. Traynham

[57] ABSTRACT

A failsafe nozzle actuating system for an aircraft gas turbine engine axisymmetric vectoring exhaust nozzle has a vectoring ring operably linked to a plurality of pivotal flaps which are circumferentially disposed about a nozzle centerline and bounding an exhaust gas flowpath in the nozzle. The failsafe nozzle actuating system has at least two independently operable first and second vectoring actuating systems including first and second groups of actuators operably connected to the vectoring ring and first and second failsafe control means to control power to the first and second groups of actuators, respectively. The first group of vectoring actuators is interdigitated with the second group of second vectoring actuators around the nozzle. Either of the two groups of actuators are operable to actuate the nozzle when the other group is failsafed.

17 Claims, 5 Drawing Sheets

AXISYMMETRIC VECTORING NOZZLE ACTUATING SYSTEM HAVING MULTIPLE POWER CONTROL CIRCUITS

BACKGROUND OF THE INVENTION

1. Field of the Invention

The present invention relates generally to gas turbine engine axisymmetric vectoring exhaust nozzles and, more particularly, to actuating systems of such engines having multiple power circuits to control the vectoring ring.

2. Discussion of the Background Art

Military aircraft designers and engineers constantly strive to increase the maneuverability of the aircraft, both for air to air combat missions and complicated ground attack missions. They have developed thrust vectoring nozzles, which turn or vector the exhaust flow and thrust of the gas turbine engine powering the aircraft, to replace or augment the use of conventional aerodynamic surfaces such as flaps and ailerons. One newly developed thrust vectoring nozzle is an axisymmetric vectoring exhaust nozzle disclosed in U.S. Pat. No. 4,994,660, by Hauer, herein incorporated by reference. The axisymmetric vectoring exhaust nozzle provides a means for vectoring the thrust of an axisymmetric convergent/divergent nozzle by universally pivoting the divergent flaps of the nozzle in an asymmetric fashion or, in other words, pivoting the divergent flaps in radial and tangential directions with respect to the unvectored nozzle centerline. The flaps are pivoted by a vectoring ring which can be axially translated and gimballed or tilted about its horizontal and vertical axis (essentially have its attitude adjusted) through a limited range.

The axisymmetric vectoring exhaust nozzle, as well as more conventional gas turbine engine exhaust nozzles, include primary and secondary exhaust flaps arranged for defining a variable area convergent-divergent exhaust nozzle. The exhaust nozzle is generally axisymmetric or annular and the exhaust flow is confined by the primary or convergent flaps up to the nozzle's throat and then by secondary or divergent flaps. The divergent flaps, for example, have a forward end defining a throat of minimum flow area and an aft end having a larger flow exit area for defining a diverging nozzle extending downstream from the throat. The divergent flaps are variable, which means that the spacing between the divergent flaps as they are moved from a smaller radius position to a larger radius position must necessarily increase. Accordingly, exhaust nozzle seals are suitably secured between adjacent divergent flaps to confine the exhaust flow and prevent leakage of exhaust flow between the divergent flaps.

Vectoring nozzles and, in particular, axisymmetric vectoring exhaust nozzles of the type disclosed in the Hauer reference, provide positionable divergent flaps. These divergent flaps are positionable not only symmetrically relative to a longitudinal centerline of the exhaust nozzle, but may also be positionable asymmetrically relative thereto for obtaining pitch and yaw vectoring. The axisymmetric vectoring exhaust nozzle disclosed in U.S. Pat. No. 4,994,660, by Hauer, uses three vectoring actuators to translate and tilt a vectoring ring which in turn forces the divergent flaps in predetermined positions. The vectoring ring tilt angle and tilt direction establish the nozzle's vector angle and vector direction, respectively. Axial translation of the vectoring ring establishes the exit area (often referred to as A9) for a given throat area (often referred to as A8).

Modern multi-mission aircraft application employ engines, such as the GE F110 engine, with convergent/divergent nozzles to meet operational requirements. Convergent/divergent nozzles have, in serial flow relationship, a convergent section, a throat, and a divergent section. Characteristically, these nozzles employ variable area means at both the nozzle throat and at the nozzle exit. This provides a means to maintain a desired exit to throat area ratio, which in turn allows efficient control over the operation of the nozzle. The operation of the nozzle is designed to provide a nozzle exit/throat area (A9/A8) schedule which is optimized for the design cycle of the engine and ideally should provide efficient control at both low subsonic and high supersonic flight conditions. These types of nozzles typically use pneumatic or hydraulic actuators to provide the variable operation. Typically, the exit and throat areas are mechanically coupled to each other in such a manner as to create an area ratio (A9/A8) schedule which is a function of nozzle throat area (A8). Thrust vectoring nozzles typically have the ability to independently control nozzle exit area and throat area which allows the engine to achieve a higher level of performance across a wide range of engine operating conditions.

During engine and aircraft operation it is possible for the hydraulic actuating system for the nozzle to fail in any one or more of several modes due to a component malfunction or damage such as due to combat. The failure may be due to a mechanical or control system malfunction which is typically detected by a flight control computer and/or a vector electronic control used for a thrust vectoring nozzle. Such a nozzle actuating system has been provided with a hydraulic failsafe position using vectoring ring actuators to fully retract and in the case of a vectoring ring to set the nozzle in a fixed unvectored position so that thrust of the engine is not vectored. These vectoring actuators are also used to control A9. However, the resulting nozzle geometry has a very large area ratio (A9/A8) which impedes opening A8 and, therefore, augmentor operation and is not aerodynamically optimal. Such a failsafe system is not good in combat. The large area ratio also can cause flow separation of the exhaust plume inside the divergent section of the nozzle. Intermittent separation and reattachment of the flow, particularly, in an asymmetric fashion with respect to the engine centerline, could result in an inadvertent vector force. Fully opening the divergent portion of the nozzle results in vastly different nozzle kinematics and opening the throat of the nozzle at this high area ratio could severely damage the nozzle. The inability to open the nozzle throat prevents nominal operation of the engine at ground idle conditions and in the afterburner mode, which could cause the operation of the aircraft to deviate from the norm.

These shortcomings are addressed by U.S. Ser. No. 08/314,124 filed Sep. 29, 1994 which discloses a failsafe mechanism that can rapidly configure the nozzle in a safe operating mode in case of certain types of hydraulic system failure such that the failsafe system can operate with a minimal adverse effect on the overall operability of the aircraft and its engine, particularly during combat. However, the nozzle can no longer vector the thrust which is a significant disadvantage during combat operations.

An inherent and significant disadvantage of a three actuator arrangement is that a large span exists between any two actuators for a given secondary ring size. Beam theory engineering dictates that deflection for a simply supported beam is proportional to the load raised to the first power and the span raised to the third power and is inversely proportional to stiffness. In other words, for a given load and stiffness, deflection will increase by a factor of eight (two raised to the third power) if the span is doubled. A three actuator arrangement for a vectoring nozzle results in the longest possible span between two actuators and, therefore, requires the highest possible stiffness and resulting weighty secondary actuation ring in order to provide a given minimal acceptable amount of deflection during the vectoring mode.

Deflection of the actuation ring is undesirable because it allows the divergent system of a vectoring nozzle to unload toward the unvectored state and, therefore, decreases vectoring performance. Deflection can be decreased by maximizing the cross section and managing the divergent load path with internal ribs as described in U.S. Pat. application Ser. No. 08/243,015. Another inherent disadvantage of a three actuator arrangement for a vectoring nozzle system is the negative effect that an actuation system malfunction could have on aircraft operation. Three actuators are the minimum required to hold the secondary ring at a fixed position and tilt angle. If one actuator malfunctions (by, for instance, a hydraulic failure) then the ring tilt would no longer be restrained and an uncommanded vectoring of the exhaust gases could occur. Such an occurrence is highly undesirable.

Vectoring ring actuation system malfunction occurrences can be reduced to a practical level by adding preventive measures which include redundant components set up in a configuration such that failure of any one component would not result in failure of the entire actuation system. These preventive measures adds cost, complexity and weight to the system. An alternate approach to a vectoring ring actuation system malfunction is to control the effect of a malfunction by using reactive measures which could include adding components to sense the malfunction and then actively position the ring into a failsafe position. All of these schemes add cost, complexity and weight to the system and, perhaps equally as important, they all center the tilt of the secondary ring to a neutral position thereby taking away all vectoring capability of the vectoring exhaust nozzle system. Taking away the vectoring capability is particularly detrimental if the aircraft system intends to use thrust vectoring for short takeoff or landing as might be required for battle damaged runways or aircraft carrier operations or under combat conditions. Therefore, it is highly desirable to have an axisymmetric vectoring exhaust nozzle that has a hydraulic failsafe system, minimizes loading on the vectoring ring, and allows the nozzle to vector thrust when a failure occurs in a component of the actuation system and not result in failure of the entire actuation system.

SUMMARY OF THE INVENTION

The present invention is a failsafe nozzle actuating system for an aircraft gas turbine engine axisymmetric vectoring exhaust nozzle having a vectoring ring operably linked to a plurality of pivotal flaps which are circumferentially disposed about a nozzle centerline and bounding an exhaust gas flowpath in the nozzle. The failsafe nozzle actuating system has a first vectoring actuating system having a first group of actuators operably connected to the vectoring ring and a first failsafe control means to control power to the first group of actuators. A second vectoring actuating system having a second group of actuators operably connected to the vectoring ring and a second failsafe control means is provided to control power to the second group of actuators. The actuators of the first group are interdigitated with the actuators of the second group around the nozzle.

The preferred embodiment provides two groups of actuators and two corresponding vectoring actuating systems, each having a group of three failsafe actuators. However, the invention includes using two or more actuators and having two or more corresponding vectoring actuating systems. The preferred embodiment of the failsafe nozzle actuating system is hydraulically powered.

A more particular embodiment provides a single source of hydraulic power in the form of an engine mounted and driven hydraulic pump operable in hydraulic power supply communication with each of the first and second group of actuators and corresponding failsafe control means. Alternatively, two engine mounted and driven hydraulic pumps are used as the first and second sources of hydraulic power that are each only in corresponding hydraulic power supply communication with one of the first and second groups of actuators and corresponding failsafe control means, respectively. One of the two pumps may also be an aircraft hydraulic pump that is also used to power aircraft hydraulic systems. Alternatively, two aircraft hydraulic pumps may be used as the first and second sources of hydraulic power that are each only in corresponding hydraulic power supply communication with one of the first and second groups of actuators and corresponding failsafe control means, respectively.

An alternative embodiment of the present invention provides two groups of actuators and two corresponding vectoring actuating systems, each having a group of two failsafe actuators. However, this embodiment doesn't provide nozzle thrust vectoring in the failsafe mode but does provide control of the nozzle exit/throat area ratio (A9/A8) in the failsafe mode.

A more particular embodiment provides a control system that monitors hydraulic pressure signals of various components in the actuating system including the control system and includes a failsafe mode actuating means to invoke the failsafe mode when the control system detects a loss of signal (a significant predetermined hydraulic pressure drop) from these components. The signal generating means may be one or more of the following: a flight control computer, a vector electronic control, and a pilot operated switch.

ADVANTAGES OF THE INVENTION

The present invention provides advantages over previous nozzle designs by providing the capability of bringing a thrust vectoring nozzle to a failsafe mode in response to a failure or malfunction signal in the hydraulic actuating system of the nozzle without completely losing thrust vectoring capability, which is particularly important under combat conditions, and also minimizes loading on the vectoring ring. The present invention also provides control of nozzle exit/throat area (A9/A8) when the thrust vectoring nozzle is placed in a failsafe mode.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
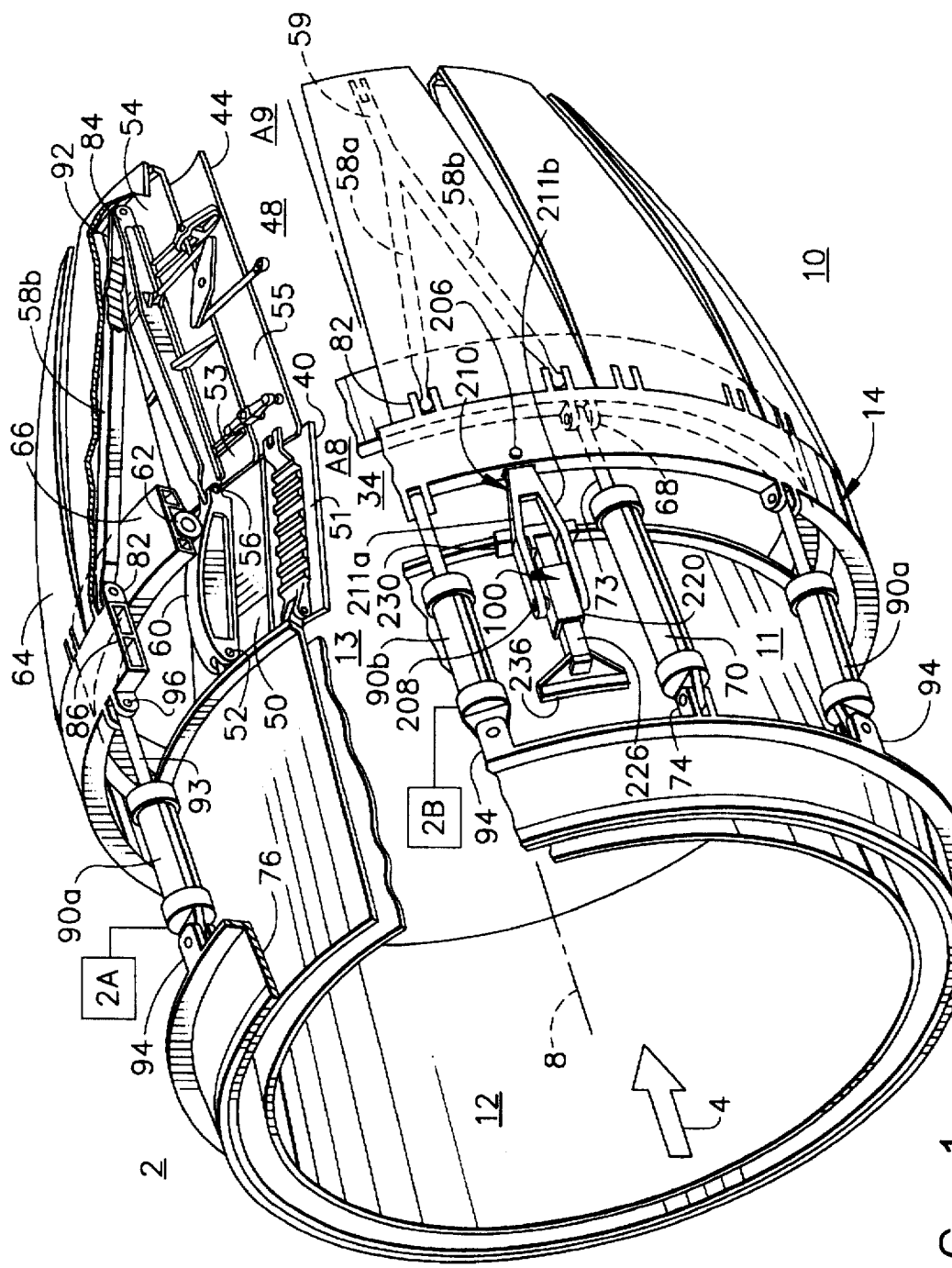
FIG. 1 is a perspective view of an axisymmetric vectoring exhaust nozzle having a failsafe nozzle actuating system in accordance with one embodiment of the present invention.

An embodiment of the present invention is illustrated in FIG. 1 as a failsafe nozzle actuating system generally shown at 2 for an axisymmetric thrust vectoring nozzle 14 in an exhaust section 10 of an aircraft gas turbine engine (not shown in its entirety). The exhaust section 10 contains the hot exhaust flow 4 in the exhaust flowpath, is generally circumferentially disposed about an engine centerline 8, and includes, in serial flow relationship, a fixed area duct or engine casing 11, including an afterburner liner 12, and a variable area downstream section 13 of the axisymmetric thrust vectoring nozzle 14 of the convergent/divergent type similar to the one referenced previously in the Hauer patent. Referring to FIG. 1, nozzle 14 comprises in serial flow relationship a convergent section 34, a throat 40 and the divergent section 48. The convergent section 34 includes a plurality of convergent or primary flaps 50 circumferentially disposed about the engine centerline 8 with overlapping primary seals 51 disposed between and in sealing engagement with the radially inward facing surface of circumferentially adjacent primary flaps 50. Each primary flap 50 is pivotally attached at its forward end to casing 11 by first pivotal or clevis joint 52. Each divergent flap 54 is pivotally attached at its forward end 53 to the aft end of the primary flap 50 that is adjacent downstream to it by a universal two degree of freedom (2 DOF) joint means 56 generally at an axial position in the nozzle 14 which coincides with throat 40. Divergent flaps 54 are generally circumferentially disposed about engine centerline 8 with overlapping secondary or divergent seals 55 disposed between and in sealing engagement with the radially inward facing surface of circumferentially adjacent divergent flaps 54. The divergent seals 55 are designed to seal against the divergent flaps 54 during nozzle operation when the nozzle pressure, the pressure radially inward of the flaps and seals, is normally greater than the pressure outside the nozzle, typically ambient air or nozzle bay pressure. Throat 40 has associated with it a throat area conventionally denoted as A8 and the nozzle exit 44 is generally at the end of divergent flaps 54 and has an exit area associated with it conventionally denoted as A9.

A plurality of cam rollers 62 are disposed in a primary ring 66 which in turn is translated forward and aft by a plurality of first nozzle actuators 70, of which there are four in the preferred embodiment. The variable throat area A8 is controlled by the action of cam roller 62 on the cam surface 60 which is formed on the back of primary flap 50. During operation the high pressure of the exhaust gases within the nozzle force primary flaps 50 and divergent flaps 54 radially outward thus keeping cam surface 60 in contact with one of the cam rollers 62. A conical annular actuator support 76 is mounted at its narrow forward end to engine casing 11 and first nozzle actuator 70 is pivotally connected to the wide aft end of the actuator support 76 by a spherical joint 74. First nozzle actuator 70 has an actuator rod 73 which in turn is connected to primary ring 66 by a spherical joint 68.

A first group of first vectoring actuators 90A, of which there are three in the preferred embodiment, are equi-angularly disposed circumferentially around casing 11 and mounted to actuator support 76 by spherical joints 94 in a similar manner as first nozzle actuators 70. A second group of second vectoring actuators 90B, of which there are three in the preferred embodiment, are equi-angularly disposed circumferentially around casing 11, interdigitated with the first group of first vectoring actuators 90A, and mounted to actuator support 76 by spherical joints 94 in a similar manner as first nozzle actuators 70. The first and second groups of vectoring actuators 90A and 90B are interdigitated with each other such that they are separated by an angle A between all adjacent first and second vectoring actuators 90A and 90B, respectively. In the exemplary embodiment of the present invention illustrated in the FIGURE, there are three first vectoring actuators 90A and three second vectoring actuators 90B and the angle A is 60 degrees. A vectoring ring 86 is connected to the first and second vectoring actuators 90A and 90B, respectively, at the aft end of vectoring actuator rods 93 of each of the vectoring actuators by a spherical joint 96. This provides for vectoring ring 86 to be axially translated and tilted about centerline 8 in order to control its attitude as well as its axial displacement along the engine centerline 8. The vectoring ring 86 controls the positioning or pivoting of divergent flaps 54. Divergent flap 54 is pivotally connected to primary flap 50 by a 2 DOF universal joint means 56 and is pivotally controlled in a multi-degree of freedom manner by a plurality of respective Y-frames 59 having control arms 58a and 58b that operably connect vectoring ring 86 to divergent flap 54. Outer flaps 64 are at least partially supported by Y-frames 59 and provide a clean and smooth aerodynamic shape along the exterior of the nozzle.

Control arms 58a and 58b are connected to vectoring ring 86 by 3 DOF spherical joints 82 and to the aft end of divergent flap 54 by a spherical joint 84. This linkage is operable to translate an attitude change of vectoring ring 86 into a multi-degree of freedom pivoting change or orbital movement of divergent flap 54 whereby each divergent flap may be pivoted through a different angle. The use of spherical joints 82 to attach control arms 58a and 58b provides clevis type pivoting of Y-frame 59 while preventing any twisting loads that may be imparted to either control arms 58a or 58b from being transferred back to vectoring ring 86. Backbone 92 provides a mount for divergent flap 54 and support for joints 84 and 56 at its two ends.

Thrust vectoring nozzles vector thrust by positioning the divergent flaps 54 and seals 55 axisymmetrically relative to the centerline 8, therefore, the radial and circumferential positions and attitude of the divergent flaps and seals. The vectoring ring 86 is translated and gimballed about nozzle centerline 8 by the three first vectoring actuators 90A and three second vectoring actuators 90B acting in concert to vector the thrust and translate the vectoring ring to accommodate and/or control the variable exit area A9 and set the exit area to throat area ratio A9/A8. The variable throat area A8 may be independently set by translation of the primary ring 66 by the first actuators 70 to set the exit area to throat area ratio A9/A8. Alternatively, both sets of actuators and rings may be used in combination to set the exit area to throat area ratio A9/A8. In an emergency when the actuating system 2 is placed in a failsafe mode, such that only the first group of first vectoring actuators 90A or the second group of second vectoring actuators 90B can be operated and the other is failsafed, either set can be used to actuate the ring 86 by translating and gimballing it about the centerline 8. The actuating system 2 includes an electronic controller EC which may be a separate unit or part of a vector electronic control VEC. The present invention provides the failsafe nozzle actuating system 2 with two separately controlled first and second vectoring actuating systems 2A and 2B, respectively. The first vectoring actuating system 2A controls only the first group of first vectoring actuators 90A and the second vectoring actuating system 2B controls only the only the second group of second vectoring actuators 90B.

Figure 2:
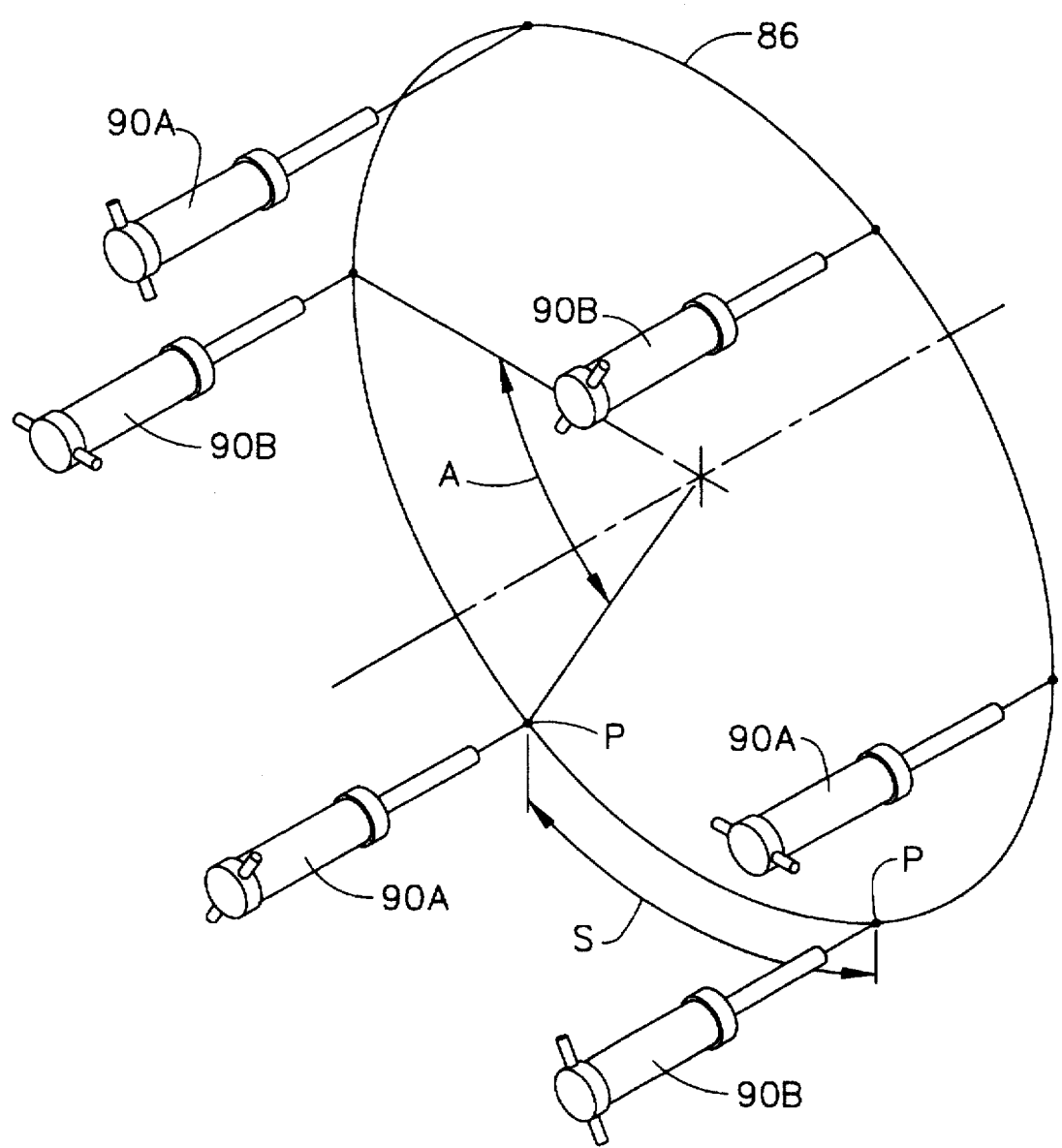
FIG. 2 is a perspective schematic view depicting a positions f the actuators and vectoring ring of the failsafe nozzle actuating system in FIG. 1.

Illustrated in FIG. 2 is the arrangement of the first vectoring actuators 90A interdigitated with the second group of second vectoring actuators 90B around the nozzle showing that either group can be operated, while the other group is failsafed to actuate the ring 86 by translating it along and gimballing it about the centerline 8. Also illustrated is the advantage of providing a shorter circular span S along the ring 86 between attachment points P of the first vectoring actuators 90A and the second group of second vectoring actuators 90B to the vectoring ring. This allows for a less beefy ring 86 and a lower weight vectoring ring. The six actuators are of a smaller size than would be required if only three were used so that the overall weight of the vectoring nozzle system is kept to a minimum. The overall weight for a six actuator system may even be lower than that for a three actuator system as well as being part of the of a failsafe system which permits at least partial thrust vectoring if one group of three actuators are failed during combat.

Figure 3:
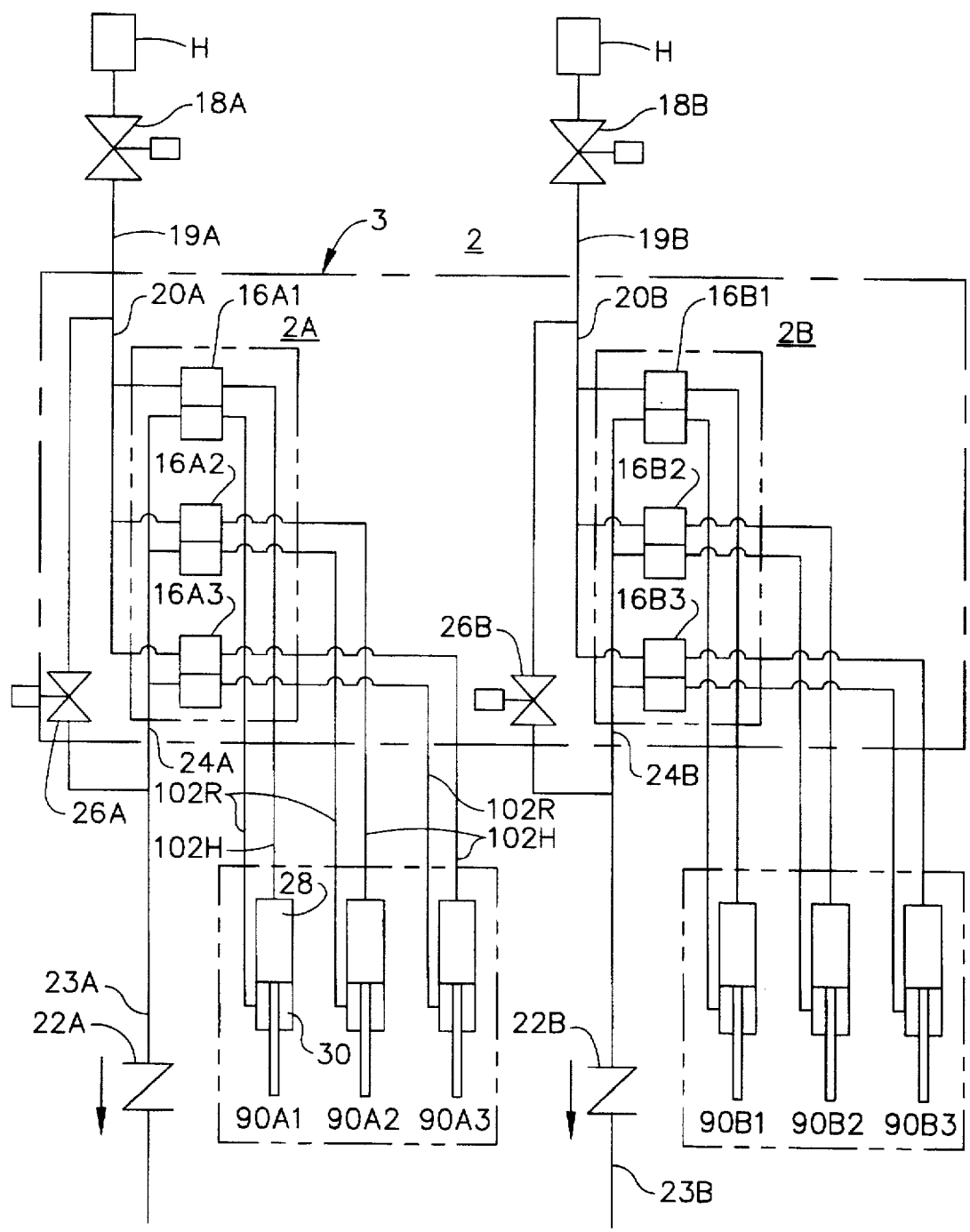
FIG. 3 is a schematic view of the actuating system in accordance with one embodiment of the present invention.

The present invention provides a failsafe nozzle actuating system 2 having the two separately controlled first and second vectoring actuating systems 2A and 2B, respectively, which are illustrated in greater detail in FIG. 3. The first vectoring actuating system 2A controls the actuation of a first vectoring actuator 90A1, a second vectoring actuator 90A2, and a third vectoring actuator 90A3 using a first actuator servovalve set containing a first actuator servovalve 16A1, a second actuator servovalve 16A2, and a third actuator servovalve 16A3 each of which only controls a corresponding one of the vectoring actuators 90A1–90A3. Similarly, the second vectoring actuating system 2B controls the actuation of a second set of fourth, fifth, and sixth vectoring actuators 90B1–90B3, respectively, using a second actuator servovalve set containing a fourth actuator servovalve 16B1, a fifth actuator servovalve 16B2, and a sixth actuator servovalve 16B3 each of which only controls a corresponding one of the fourth, fifth, and sixth vectoring actuators 90B1–90B3. Each set and each of the three servovalves in each set is independently controllable. It is preferable that the servovalves in both systems be packaged into one control valve 3 to minimize the number of components added. Alternatively each set of three servovalves can be packaged into separate control valves or integrated into their respective actuators.

The first and second vectoring actuating systems 2A and 2B have first and second supply isolation valves 18A and 18B operably disposed in first and second supply lines 19A and 19B, respectively, which lead to first and second supply line headers 20A and 20B, respectively, from a source of hydraulic power H. The first and second vectoring actuating systems 2A and 2B have first and second return isolation valves 22A and 22B operably disposed in first and second return lines 23A and 23B, respectively, which lead away from first and second return line headers 24A and 24B, respectively, to the source of hydraulic power H. This allows the failsafe nozzle actuating system 2 to isolate the operable vectoring actuating system 2A or 2B from the rest of the system if a leak or malfunction were sensed in the failsafed system. A first recirculation valve 26A is operably disposed between the first supply line header 20A and the first return line header 24A and provides a means to allow hydraulic fluid flow directly between head chambers 28 and rod chambers 30 of a failsafed group of actuators.

Failsafing the first vectoring actuating system 2A is accomplished by the failsafe nozzle actuating system 2 closing the first supply isolation valve 18A and the first return isolation valve 22A. The first vectoring actuating system 2A sets the first set of three servovalves 16A1–16A3 to positions which allows hydraulic fluid to flow from the first supply line headers 20A through a first group of head lines 102H to the head chambers 28 and between the first return line header 24A through rod lines 102R to the rod chambers 30 of the first three vectoring actuators 90A1–90A3, respectively, and provides a means to allow hydraulic fluid flow directly between the head chambers 28 and rod chambers 30 of a failsafed group of actuators. The first vectoring actuating system 2A also opens the first recirculation valve 26A to allow hydraulic fluid to pass between the first supply line header 20A and the first return line header 24A.

Similarly, if the second three vectoring actuators 90B1–90B3 are to be failsafed instead, the failsafe nozzle actuating system 2 closes the second supply isolation valve 18B and the second return isolation valve 22B. The second vectoring actuating system 2B sets the second set of three servovalves 16B1–16B3 to positions which allows hydraulic fluid to pass between the second supply line headers 20B and the head chambers 28 and between the second return line header 24B and the rod chambers 30 of the second three vectoring actuators 90B1–90B3, respectively. The second vectoring actuating system 2B also opens the second recirculation valve 26B to allow hydraulic fluid to pass between the second supply line header 20B and the second return line header 24B.

The actuating system 2 uses the electronic controller EC to monitor hydraulic pressure signals of various hydraulic components in the actuating system including the control system itself and includes a failsafe mode actuating means to invoke the failsafe mode when the control system detects a loss of signal (a significant predetermined hydraulic pressure drop) from these components. A signal generating means may also be used to invoke the failsafe mode and may be part of the electronic controller EC, a flight control computer FC, a vector electronic control VEC, and/or a pilot operated switch SW.

Figure 4:
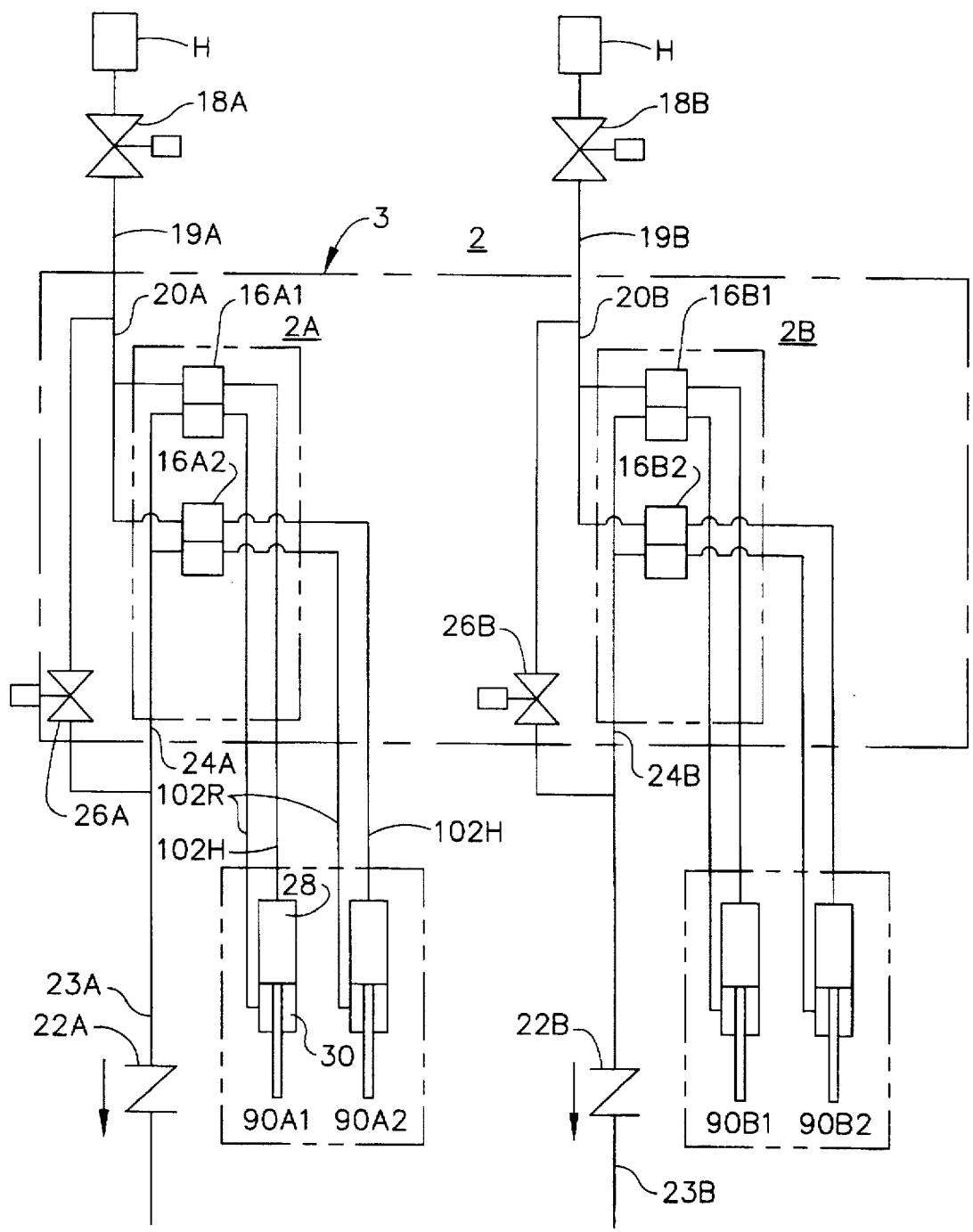
FIG. 4 is a schematic view of the actuating system in accordance with an alternative embodiment of the present invention.

An alternative embodiment of the present invention with a total of four actuators is illustrated in FIG. 4 and provides a failsafe nozzle actuating system 2 having only two separately controlled first and second vectoring actuating systems 2A and 2B, respectively, with only two first vectoring actuators 90A1 and 90A2 and two second vectoring actuators 90B1 and 90B2. The first vectoring actuating system 2A controls the actuation of the first vectoring actuator 90A1 and the second vectoring actuator 90A2 using a first actuator servovalve set containing a first actuator servovalve 16A1 and a second actuator servovalve 16A2, each of which only controls a corresponding one of the vectoring actuators 90A1 and 90A2. Similarly, the second vectoring actuating system 2B controls the actuation of a second set of fourth and fifth vectoring actuators 90B1 and 90B2, respectively, using a second actuator servovalve set containing a fourth actuator servovalve 16B1 and a fifth actuator servovalve 16B2, each of which only controls a corresponding one of the fourth and fifth vectoring actuators 90B1 and 90B2. Each set and each of the three servovalves in each set is independently controllable. It is preferable that the servovalves in both systems be packaged into one control valve 3 to minimize the number of components added. Alternatively each set of two servovalves can be packaged into separate control valves or integrated into their respective actuators.

Though this embodiment doesn't provide nozzle thrust vectoring in the failsafe mode it does allow control of the nozzle exit/throat area ratio (A9/A8) in the failsafe mode and for the design and construction of a light weight failsafe nozzle actuating system for the axisymmetric thrust vectoring nozzle 14.

Figure 5:
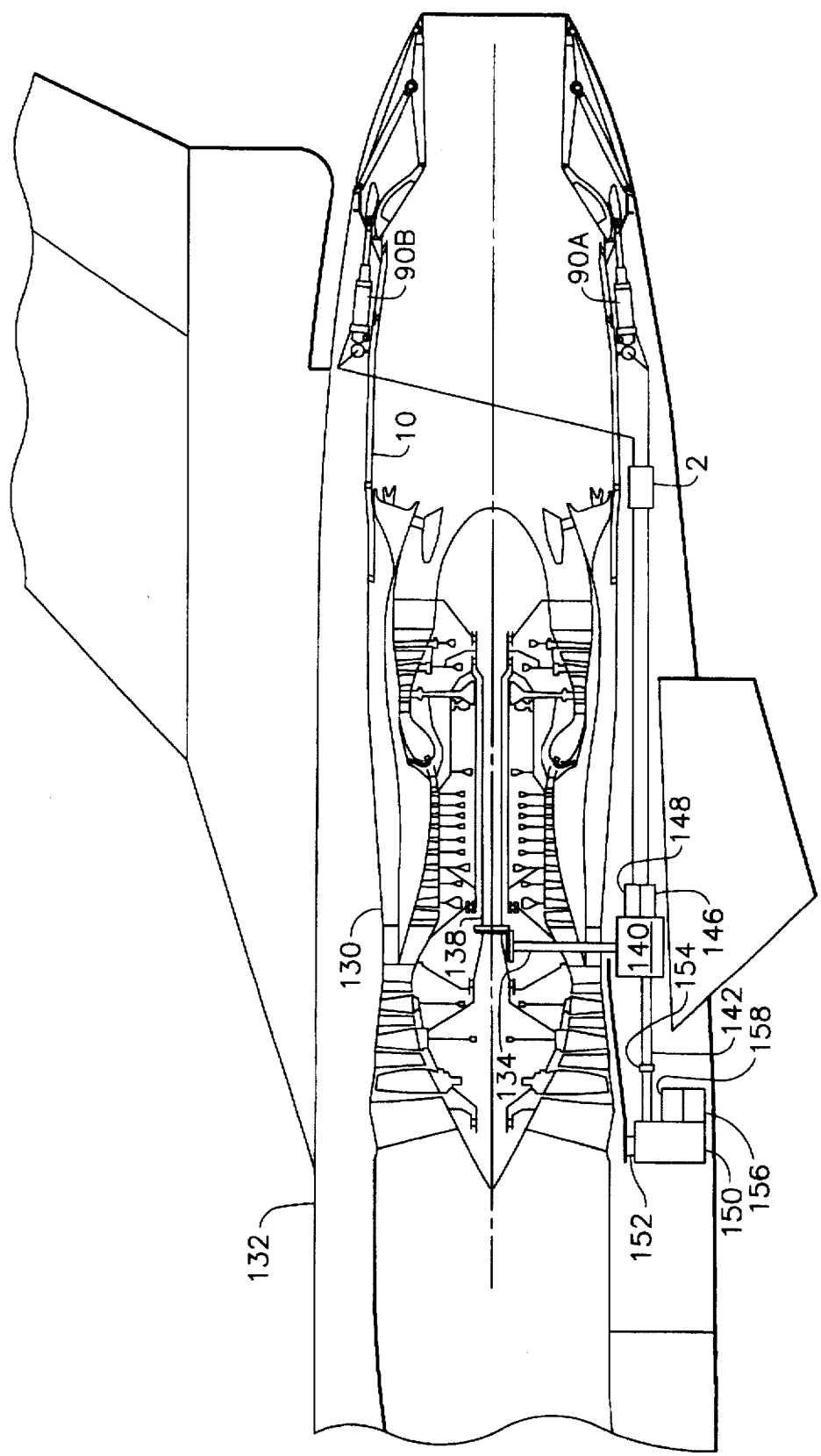
FIG. 5 is a cross-sectional view of an aircraft having an engine and vectoring nozzle with a failsafe actuating system in accordance with one embodiment of the present invention.

Illustrated in FIG. 5 are the various arrangements and locations of hydraulic pumps which could be used to supply hydraulic power to the first and second vectoring actuating systems 2A and 2B, through the first and second supply line headers 20A and 20B and the first and second return line headers 24A and 24B, respectively. An engine 130 is illustrated having the exhaust section 10 and the vectoring nozzle 14 mounted in a military type aircraft 132. The first and second vectoring actuators 90A and 90B are also shown in the drawing to help illustrate the exhaust section 10 and the vectoring nozzle 14. A power shaft 134 driven by an engine rotor 138 extends down from the rotor to an engine gear box 140 which has a right angle gear to drive a power take-off shaft 142 (PTO) extending forward towards the front of the engine 130. Mounted to and below the engine 130 are first and second engine mounted hydraulic pumps 146 and 148, respectively, which extend aft from and are driven by the engine gear box 140. The engine mounted first and second hydraulic pumps 146 and 148 are used to supply hydraulic power for the engine and engine accessories. The shaft 134 extends forward to drive an accessory drive gear box 150 which in turn has appropriate gearing to drive various accessories for the aircraft 132. The accessory drive gear box 150 is mounted to the aircraft 132 by suitable frame mounts 152 and connected to the power take-off shaft by a misalignment adapter 154.

FIG. 5 serves as a guide to illustrate different sources of hydraulic power H for the first and second vectoring actuating systems 2A and 2B. One embodiment of the present invention uses the first and second engine mounted hydraulic pumps 146 and 148 to provide the source of hydraulic power H for the first and second vectoring actuating systems 2A and 2B, respectively. Alternatively, only one of the engine mounted hydraulic pumps may be used as the source of hydraulic power H having the first and second supply lines 19A and 19B merge into one line leading to one hydraulic pump at a point between the isolation valves 18A and 18B and the source H in FIG. 3. Similarly, either one or both of first and second aircraft mounted hydraulic pumps 156 and 158, respectively, that are mounted on and driven by the accessory drive gear box 150 may be used to power the first and second vectoring actuating systems 2A and 2B. Alternatively, one of the engine mounted hydraulic pumps and one of the aircraft mounted hydraulic pumps may each be used to power only one of the vectoring actuating systems 2A and 2B. The benefit of these alternative locations for hydraulic power to power and actuate the vectoring nozzle is quite apparent. Damage suffered in part of the aircraft may damage one of the pumps thereby allowing a pump in another portion of the aircraft to keep operating to power the vectoring nozzle.

Referring back to FIG. 1, vectoring ring 86 is supported by three axially adjustable vectoring ring support means 100, equi-angularly disposed circumferentially about casing 11, that allows vectoring ring 86 to be axially translated and gimballed by the vectoring actuators 90A and 90B. An axially translating A-frame 210 supports vectoring ring 86 by a 3 DOF spherical joint 206. The A-frame 210 is pivotally attached to a slider 220 with a clevis type hinge means 208 in the form of spherical joints at the ends of arms 211a and 211b. The use of spherical joints at the ends of arms 211a and 211b provide clevis type pivoting for A-frame 210 and also eliminate the transfer of twisting loads that may be imparted to the arms. The slider 220 is slidable along a hollow slider bar 226 that is attached to engine casing 11 by forward bracket 236 and an aft bracket 230. The vectoring ring support means 100 permits the vectoring ring 86 to translate axially forward and rearward and tilt so as to change its attitude. A more detailed description of the vectoring ring support means 100 may be found in U.S. Pat. No. 5,174,502, by Lippmeier et al., entitled "Support For A Translating Nozzle Vectoring Ring", herein incorporated by reference.

While the preferred embodiment of our invention has been described fully in order to explain its principles, it is understood that various modifications or alterations may be made to the preferred embodiment without departing from the scope of the invention as set forth in the appended claims.

I claim:

1. A failsafe nozzle actuating system for an aircraft gas turbine engine axisymmetric vectoring exhaust nozzle having a vectoring ring operably linked to a plurality of pivotal flaps which are circumferentially disposed about a nozzle centerline and bounding an exhaust gas flowpath in the nozzle, said failsafe nozzle actuating system comprising:

a first vectoring actuating system having a first group of actuators circumferentially disposed about said nozzle centerline and operably connected to said vectoring ring and a first failsafe control means to control power to said first group of actuators, a second vectoring actuating system having a second group of actuators circumferentially disposed about said nozzle centerline and operably connected to said vectoring ring and a second failsafe control means to control power to said second group of actuators, each of said actuator having at least one independently controllable servovalve, and said actuators of said first group are interdigitated with said actuators of said second group around the nozzle.

2. A failsafe nozzle actuating system as claimed in claim 1 wherein the failsafe nozzle actuating system is hydraulically powered.

3. A failsafe nozzle actuating system as claimed in claim 2 further comprising a single source of hydraulic power in hydraulic power supply communication with each of said first and second failsafe control means.

4. A failsafe nozzle actuating system as claimed in claim 2 further comprising first and second sources of hydraulic power respectively that are in corresponding hydraulic power supply communication with only one each of said first and second failsafe control means respectively.

5. A failsafe nozzle actuating system as claimed in claim 4 further comprising;

said first and second failsafe control means are operable to failsafe a corresponding one of said first and second group of actuators such as to allow a failsafed group of actuators to extend to positions corresponding to any position and attitude of said vectoring ring set by a non-failsafed other one of said first and second group of actuators.

6. A failsafe nozzle actuating system as claimed in claim 5 having only two groups of actuators, said first and second groups of actuators each having only three of said actuators.

7. A failsafe nozzle actuating system as claimed in claim 5 having only two groups of actuators, said first and second groups of actuators each having only two of said actuators.

8. A failsafe nozzle actuating system as claimed in claim 5 wherein;

said first and second failsafe control means each include a recirculation valve operably disposed between head chambers and rod chambers of said actuators, and said first and second failsafe control means and said recirculation valve are operable to allow hydraulic fluid flow directly between said head chambers and rod chambers of a failsafed group of actuators when one of said groups of actuators is failsafed.

9. A failsafe nozzle actuating system as claimed in claim 8 wherein said first and second sources of hydraulic power are two engine mounted and driven hydraulic pumps wherein each of said pumps is operable to supply hydraulic power to only one of said groups of actuators and corresponding failsafe control means.

10. A failsafe nozzle actuating system as claimed in claim 8 wherein said first and second sources of hydraulic power are hydraulic pumps of which at least one of said pumps is an aircraft hydraulic pump also used to power aircraft hydraulic systems.

11. A failsafe nozzle actuating system as claimed in claim 8 wherein said first source of hydraulic power is a first engine mounted and driven hydraulic pump operable to only supply hydraulic power to only one of said groups of actuators and corresponding failsafe control means and said second source of hydraulic power is a second engine mounted and driven pump that is operable to supply hydraulic power only to another one of said groups of actuators and corresponding failsafe control means.

12. A failsafe nozzle actuating system as claimed in claim 8 wherein said first source of hydraulic power is a first aircraft hydraulic pump also used to power aircraft hydraulic systems and operable to only supply hydraulic power to only one of said groups of actuators and corresponding failsafe control means and said second source of hydraulic power is a second aircraft hydraulic pump also used to power aircraft hydraulic systems and operable to supply hydraulic power only to another one of said groups of actuators and corresponding failsafe control means.

13. A failsafe nozzle actuating system as claimed in claim 8 wherein said first and second sources of hydraulic power are two separate hydraulic supply lines in hydraulic power fluid supply communication with a single engine mounted and driven hydraulic pump which is only is operable to supply hydraulic power to both of said groups of actuators and their corresponding failsafe control means.

14. A failsafe nozzle actuating system as claimed in claim 8 wherein each of said failsafe control means is operably connected to a failsafe signal generating means to invoke said failsafe mode and said failsafe signal generating means includes at least one of a plurality of failsafe signal generating means said plurality of failsafe signal generating means comprising a flight control computer, a vector electronic control, and a pilot operated switch means for sending a failsafe signal to invoke a failsafe mode in one of said first and second failsafe control means to failsafe a corresponding one of said first and second group of actuators.

15. A failsafe nozzle actuating system as claimed in claim 14 further comprising at least two independent electronic controllers each being operable to electronically control and monitor a corresponding one of said first and second failsafe control means.

16. A failsafe nozzle actuating system as claimed in claim 15 further comprising a third independent electronic controller operable to synchronize said first and second vectoring actuating systems.

17. A failsafe nozzle actuating system as claimed in claim 16 wherein said independent electronic controllers are operably preprogrammed to synchronize said first and second vectoring actuating systems.

* * * * *